G. V. PAYNE.
METHOD FOR ASCERTAINING THE LOCATION OF LEAKS IN UNDERGROUND FLUID PRESSURE PIPES OR THE LIKE.
APPLICATION FILED APR. 25, 1918.
1,358,779. Patented Nov. 16, 1920.
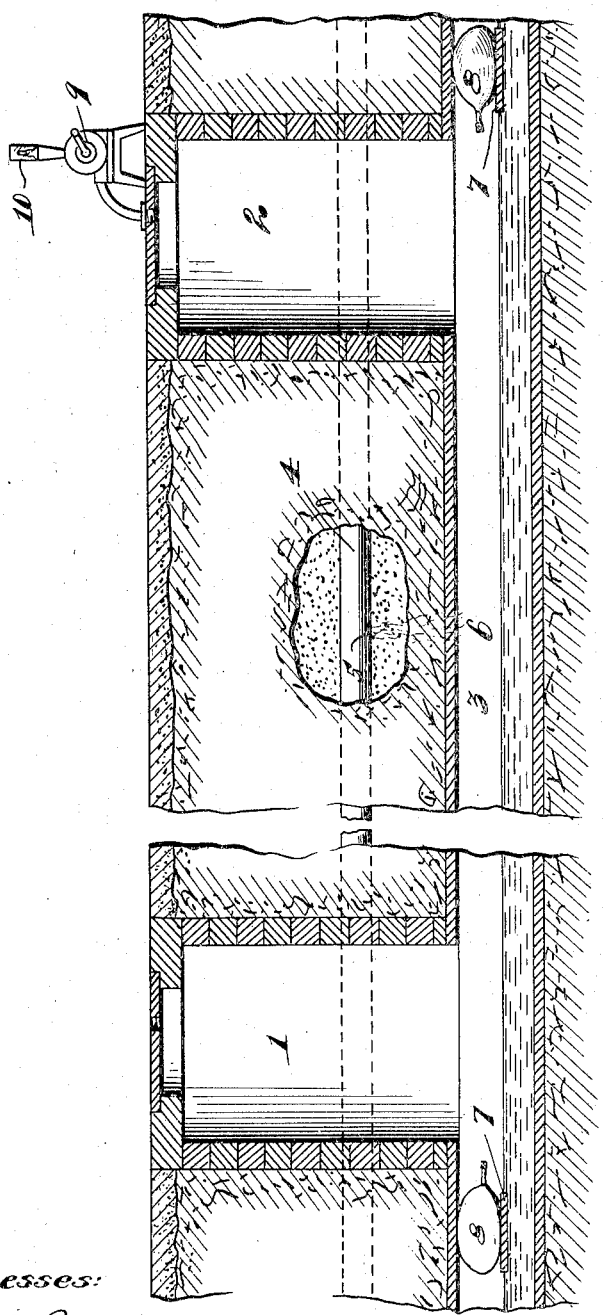
Witnesses:
C. E. Wessels
B. G. Richards
Inventor:
George V. Payne,
By Joshua R. H. Potts
Attorney.

UNITED STATES PATENT OFFICE.

GEORGE V. PAYNE, OF CHICAGO, ILLINOIS.

METHOD FOR ASCERTAINING THE LOCATION OF LEAKS IN UNDERGROUND FLUID-PRESSURE PIPES OR THE LIKE.

1,358,779.  Specification of Letters Patent.  Patented Nov. 16, 1920.

Application filed April 25, 1918. Serial No. 230,668.

*To all whom it may concern:*

Be it known that I, GEORGE V. PAYNE, a citizen of the United States, and a resident of the city of Chicago, county of Cook, and State of Illinois, have invented certain new and useful Improvements in Methods for Ascertaining the Location of Leaks in Underground Fluid-Pressure Pipes or the like, of which the following is a specification.

My invention relates to improvements in methods for ascertaining the location of leaks in under-ground fluid pressure pipes or the like, and has for its object the provision of an improved method of this character by means of which leaks may be located with great accuracy and expedition. The invention consists in the method hereinafter described and claimed.

The invention will be best understood by reference to the accompanying drawing forming a part of this specification, and which is a vertical section taken through two adjoining manholes of a sewerage system and illustrating the application of the method to such a system.

In carrying on the method in conjunction with such a system, it is usually an easy matter to determine between which two manholes a leak of gas is occurring into a sewer; the method constituting the subject matter of this invention is especially designed to facilitate the ascertaining of the approximate location of such a leak. In the system illustrated in the drawing, the adjoining manholes 1 and 2 are shown as connected by the usual sewer 3 passing under or through the bottoms thereof, and it is assumed that a leak of gas is occurring in an under-ground gas pipe or main 4 at the point 5, and that such gas is escaping into the sewer 3 at the point 6. Under these circumstances, it is an easy matter to determine that the leak is somewhere between the manholes 1 and 2, but it often is a very difficult matter to determine precisely or approximately where the leak is occurring. To this end, in carrying on the method, I first arrange partitions or boards 7 crossing the sewer 3 beyond the manholes leading thereto approximately at the level of water usually flowing in said sewer. Then inflatable rubber bags 8 are placed on top of these partitions and inflated to seal the sewer against the passage of air, as indicated. Then a blast of air is passed through the system from one manhole to the other for a considerable time, until it is certain that the corresponding manhole and sewer have been cleared of the leaking gas up to the point of leak. Then the direction of this blast of air is reversed and the time consumed until the leaking gas is detected in the reversed draft is taken. These steps may be conveniently accomplished by means of a reversible air pump 9 having a Davies or safety lamp 10 connected with one combined inlet-outlet thereof. By manipulating pump 9 the air is drawn in through the lamp 10 and forced through the system, downwardly through manhole 2, thence along sewer 3 and upwardly through the manhole 1 until the operator is satisfied that the manhole 2 and the section of sewer up to the point 6 have been cleared of the leaking gas, then the pump 9 is reversed so as to reverse the current of air to send said reversed current upwardly through the Davies or safety lamp 10 and the time of reversal noted. This operation of the pump 9 is continued at a uniform speed until the flickering of lamp 10 indicates that gas is present in the discharging current, and the time noted. Then the pump 9 is removed and re-connected with the manhole 1 and the process above outlined repeated and the time obtained until the presence of the gas is detected. This method of procedure has a tendency to compensate for inequalities or leaks in the sewer and also permits of use where the sewer or other duct is tortuous. From the ratio formed between the times thus obtained, the approximate location of the leak may be calculated. Thus, assume that it is 100 yards between the manholes 1 and 2 and that the time consumed in obtaining the first indication of the presence of gas was 40 minutes, and that consumed in obtaining the second indication of the presence of gas was 20 minutes. This would indicate that the leak was twice as far from the manhole 2 as it is from the manhole 1, or approximately one-third the distance from manhole 1, which would be one-third of one hundred yards, or 33⅓ yards. Putting the mathematical problem in a little different way, it may be stated that the fraction having the sum of the times as the denominator and the time at either manhole as the numerator, gives the ratio of the distance of the leak from the corresponding manhole to that of the distance between said manholes. Thus, to determine the distance from manhole 2 the sum of the times is 40+20=60. The ratio fraction is thus 40÷60=⅔ and ⅔ of 100=66⅔ yards, or the distance from manhole 2. Subtract this from the total distance gives the distance from manhole 1, or 100−66⅔=33⅓. Thus, it will be seen that the location of the point at which gas is leaking into the sewer 3 may be approximately determined. As the point of leakage into a sewer or the like is practically invariably in close proximity to the actual leak in the gas main, it will be seen that excavation at the location thus determined will lead to the ready discovery of the actual leak.

While I have illustrated and described the preferred method and form of construction for carrying my invention into effect, these are capable of variation and modification without departing from the spirit of the invention. I, therefore, do not wish to be limited to the precise method set forth, but desire to avail myself of such variations and modifications as come within the scope of the appended claims.

Having described my invention, what I claim as new and desire to secure by Letters Patent is:—

1. The method of locating a leak in an under-ground conduit or the like, which consists in forcing a draft of fluid through said conduit in one direction and timing the time consumed until the leaking fluid is detected, then forcing a draft of fluid through said conduit in the opposite direction and timing the time consumed until the leaking fluid is again detected; and then calculating the location of the leak from the ratio between the times thus obtained, substantially as described.

2. The method of locating a leak in an under-ground conduit or the like, which consists in drawing a draft of fluid through said conduit in one direction and timing the time consumed until the leaking fluid is detected; then drawing a draft of fluid through said conduit in the opposite direction and timing the time consumed until the leaking fluid is again detected; and then calculating the location of the leak from the ratio between the times thus obtained, substantially as described.

3. The method of locating a leak in an under-ground conduit or the like, which consists in forcing a draft of fluid through said conduit in one direction, then reversing said draft and timing the time consumed until the leaking fluid is detected; then forcing a draft of fluid through said conduit in the opposite direction, then reversing said draft and timing the time consumed until the leaking fluid is again detected; and then calculating the location of the leak from the ratio between the times thus obtained, substantially as described.

4. The method of locating a leak in an under-ground conduit or the like, which consists in forcing a draft of air through said conduit in one direction, then reversing said draft and timing the time consumed until the leaking fluid is detected; then forcing a draft of air through said conduit in the opposite direction, then reversing said draft and timing the time consumed until the leaking fluid is again detected; and then calculating the location of the leak from the ratio between the times thus obtained, substantially as described.

5. The method of locating the point of entry of gas into an underground sewer, between two manholes, which consists in first stopping said sewer beyond each manhole; then forcing a draft of air into one manhole and outwardly through the other, then reversing said draft and timing the time consumed until the leaking gas is detected; then forcing a draft of air into the other manhole and out through the first mentioned manhole and timing the time consumed until the leaking gas is again detected; and then calculating the location of the leak from the ratio between the times thus obtained, substantially as described.

6. The method of locating the point of entry of gas into an underground sewer between two manholes, which consists in first placing partitions across said sewer approximately at the level of any water therein and beyond each manhole; then inserting and inflating bags in the spaces above said partitions; then forcing a draft of air into one manhole and outwardly through the other; then reversing said draft and timing the time consumed until the leaking gas is detected; then forcing a draft of air into the other manhole and out through the first mentioned manhole and then reversing said draft and timing the time consumed until the leaking gas is again detected, and then calculating the location of the leak from the ratio between the times thus obtained, substantially as described.

7. The method of locating the point of entry of gas into an under-ground sewer between two manholes, which consists in first placing partitions across said sewer approximately at the level of any water therein and beyond each manhole; then inserting and inflating bags in the spaces above said partitions; and then testing the air between said manholes for the location of the leak, substantially as described.

8. The method of locating a leak between two points in an under-ground conduit or the like, which consists in stopping said conduit beyond each of said points and testing the intermediate contents for the presence of an entering fluid, substantially as described.

9. The method of locating a leak in an under-ground conduit or the like, which consists in forcing a draft of fluid through said conduit in one direction and timing with a Davies lamp the time consumed until the leaking fluid is detected; then forcing a draft of fluid through said conduit in the opposite direction and timing with a Davies lamp the time consumed until the leaking fluid is again detected; and then calculating the location of the leak from the ratio between the times thus obtained, substantially as described.

10. The method of locating the point of entry of gas into an under-ground sewer between two manholes, which consists in first placing partitions across the sewer approximately at the level of any water therein, and beyond each manhole; then inserting and inflating bags in the spaces above said partitions; then forcing a draft of air into one manhole and downwardly through the other; then reversing said draft and timing by means of a Davies lamp the time consumed until the leaking gas is detected; then forcing a draft of air into the other manhole and out through the first mentioned manhole; then reversing said draft and timing by means of a Davies lamp the time consumed until the leaking gas is again detected; and then calculating the location of the leak from the ratio between the times thus obtained, substantially as described.

In testimony whereof I have signed my name to this specification in the presence of two subscribing witnesses.

GEORGE V. PAYNE.

Witnesses.
JOSHUA R. H. POTTS,
HELEN F. LILLIS.